United States Patent
Gonsalves et al.

(10) Patent No.: US 6,269,195 B1
(45) Date of Patent: *Jul. 31, 2001

(54) APPARATUS AND METHODS FOR SELECTIVELY FEATHERING A COMPOSITE IMAGE

(75) Inventors: Robert Gonsalves, Wellesley; Chia-Sheng Chou, Cambridge, both of MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/018,061

(22) Filed: Feb. 3, 1998

Related U.S. Application Data (63) Continuation-in-part of application No. 08/832,871, filed on Apr. 4, 1997, now Pat. No. 6,137,919.

(51) Int. Cl.[7] .................................................. G06K 9/36
(52) U.S. Cl. ............................................. 382/284; 382/266
(58) Field of Search .................................. 382/284, 268, 382/266, 264, 265, 261; 348/584, 586, 593; 345/435

(56) References Cited

U.S. PATENT DOCUMENTS

| 4,367,465 | 1/1983 | Mati et al. ............................ 345/180 |
| 4,488,245 | 12/1984 | Dalke et al. ......................... 382/167 |
| 4,492,978 | 1/1985 | Thomas ................................ 348/439 |
| 4,571,632 | 2/1986 | Schaphorst et al. ................. 358/428 |
| 4,698,666 | 10/1987 | Lake, Jr. et al. ...................... 348/584 |
| 4,782,397 | 11/1988 | Kimoto ................................ 358/448 |
| 4,827,344 | 5/1989 | Astle et al. ........................... 348/597 |
| 4,831,447 * | 5/1989 | Lake, Jr. .............................. 358/183 |
| 4,835,532 * | 5/1989 | Fant ..................................... 340/728 |
| 4,855,934 * | 8/1989 | Robinson ............................. 364/521 |
| 5,022,085 * | 6/1991 | Cok ...................................... 382/1 |
| 5,129,013 | 7/1992 | Holzmann et al. .................. 382/276 |
| 5,140,416 | 8/1992 | Tinkler ................................. 348/33 |
| 5,146,325 | 9/1992 | Ng ...................................... 348/439 |
| 5,181,113 | 1/1993 | Chang ................................ 348/461 |
| 5,185,808 * | 2/1993 | Cok ...................................... 382/1 |
| 5,218,671 | 6/1993 | Liao et al. ........................... 345/431 |
| 5,241,372 | 8/1993 | Ohba ................................... 348/578 |
| 5,283,651 | 2/1994 | Ishizuka .............................. 348/704 |
| 5,317,678 | 5/1994 | Okawara et al. .................... 345/426 |

(List continued on next page.)

FOREIGN PATENT DOCUMENTS

| 0 517 035 A2 | 9/1992 | (EP) . |
| 0 709 806 A2 | 5/1996 | (EP) . |
| WO 97/06631 | 2/1997 | (WO) . |

OTHER PUBLICATIONS

Alan Wm. Paeth, Distance Approximations and Bounding Polyhedra, Copyright © 1995 by Academic Press, Inc., pp 78–87.

James D. Foley and Andries Van Dam, Fundamentals of Interactive Computer Graphics Copyright © 1982 by Addison–Wesley Publishing Company, Inc., pp 245–249.

(List continued on next page.)

*Primary Examiner*—Yon J. Couso (57) ABSTRACT

A mechanism and process for feathering a first image and a second image in a composite image includes defining an original matte image. A portion of the original matte image is box filtered horizontally and vertically to generate an intermediate matte image. At least a portion of the intermediate matte image is box filtered horizontally and vertically to generate a processed matte image. An edge biasing function is applied to the processed matte image. Edge biasing includes further modifying pixel values on an edge by changing the contrast and brightness of the matte image. A composite image including the first image and the second image is then generated after applying the edge biasing function to the box-filtered processed matte image.

29 Claims, 9 Drawing Sheets

U.S. PATENT DOCUMENTS

| | | | |
|---|---|---|---|
| 5,325,449 | | 6/1994 | Burt et al. .............................. 382/240 |
| 5,347,622 | * | 9/1994 | Takemoto et al. .................... 395/135 |
| 5,444,835 | | 8/1995 | Turkowski ............................ 345/435 |
| 5,450,134 | | 9/1995 | Legate .................................. 348/467 |
| 5,479,922 | | 1/1996 | Reichl .................................. 128/630 |
| 5,488,674 | | 1/1996 | Burt et al. ............................ 382/284 |
| 5,506,946 | | 4/1996 | Bar et al. .............................. 345/431 |
| 5,510,843 | | 4/1996 | Keene et al. ......................... 348/447 |
| 5,532,751 | | 7/1996 | Lui ....................................... 348/448 |
| 5,557,334 | | 9/1996 | Legate .................................. 348/473 |
| 5,557,339 | | 9/1996 | Dadourian ............................ 348/586 |
| 5,581,667 | * | 12/1996 | Bloomberg ........................... 382/264 |
| 5,600,376 | | 2/1997 | Casavant et al. ..................... 348/439 |
| 5,625,421 | | 4/1997 | Faroudia et al. ..................... 348/448 |
| 5,630,037 | | 5/1997 | Schindler ............................. 382/164 |
| 5,633,687 | | 5/1997 | Bhavani et al. ...................... 348/441 |
| 5,659,639 | | 8/1997 | Mahoney et al. .................... 382/309 |
| 5,661,525 | | 8/1997 | Kovačević et al. .................. 348/448 |
| 5,663,765 | | 9/1997 | Matsuse et al. ...................... 348/448 |
| 5,703,654 | | 12/1997 | Iizuka .................................. 348/474 |
| 5,703,659 | | 12/1997 | Tanaka ................................. 348/576 |
| 5,875,267 | * | 2/1999 | Djakovic .............................. 382/266 |
| 5,881,179 | * | 3/1999 | Gillard ................................. 382/261 |

OTHER PUBLICATIONS

Eric N. Mortensen and William A. Barrett, Intelligent Scissors for Image Composition Computer Graphics Proceedings, Annual Conference Series 1995, Siggraph 95 Conference Proceedings Aug. 6–11, 1995, A publication of ACM SIGGRAPH, pp. 191–198.

Alvy Ray Smith and James F. Blinn, Blue Screen Matting, Computer Graphics Proceedings, Annual Conference Series, 1996, SIGGRAPH 96, New Orleans, Louisiana, Aug. 4–9, 1996, pp 259–268.

* cited by examiner

APPARATUS AND METHODS FOR SELECTIVELY FEATHERING A COMPOSITE IMAGE

This application is a continuation-in-part of and claims priority under 35 U.S.C. §120 to U.S. patent application Ser. No. 08/832,871, filed Apr. 4, 1997, now U.S. Pat. No. 6,137,919.

FIELD OF THE INVENTION

The present invention relates generally to image editing systems, and more particularly, to techniques for feathering images such as for combining two images to produce a composite image.

BACKGROUND OF THE INVENTION

Producers of motion video programs use a variety of special effects to produce a final product. A graphics editor performs the task of adding special effects to motion video segments using a graphics workstation.

Feathering is a special effect that blurs one or more portions of a video image. Feathering often is used when creating a composite video image from a foreground image and a background image. The graphics editor feathers the border between the images thereby blending the images together to create an effect that the two images are truly one image. For example, a composite image including a foreground image of two people walking and a background image of a desert scene, when feathered, provides an appearance of the two people walking in the desert.

Figure 1:
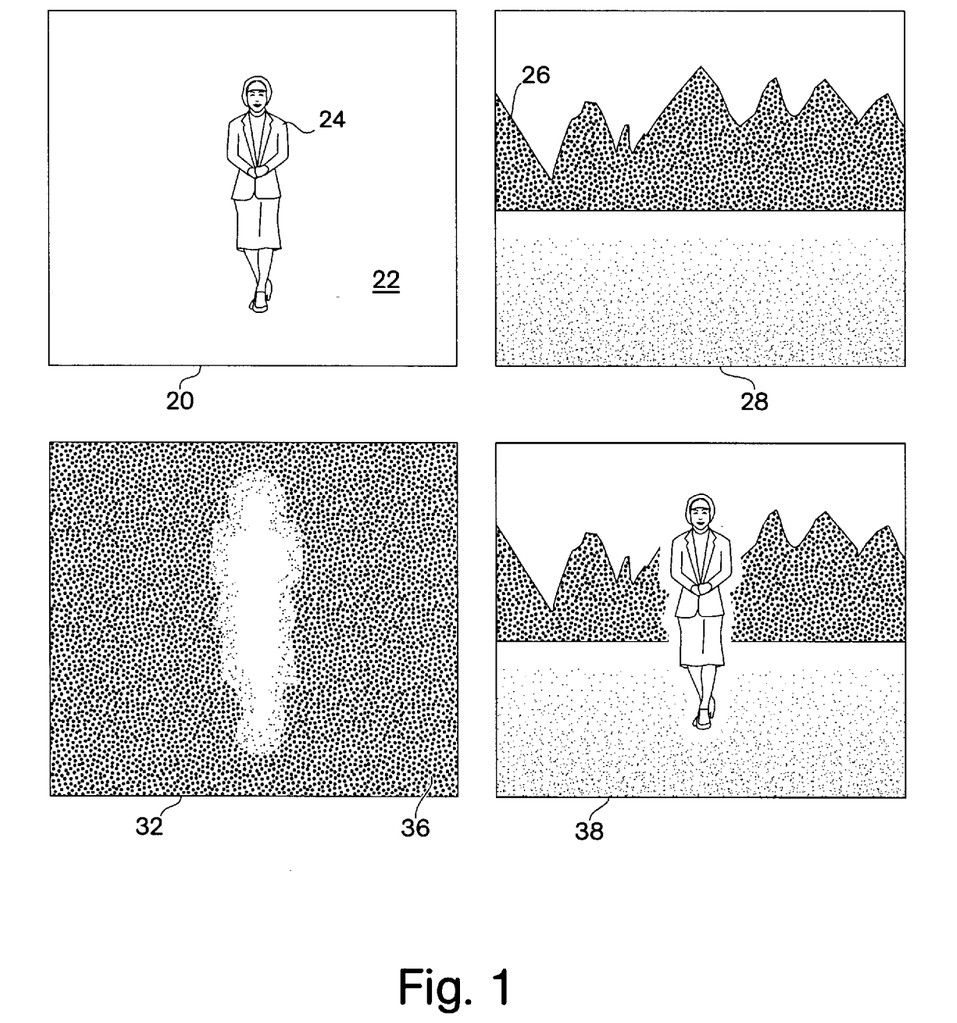
FIG. 1 is a block diagram of a process for generating a feathered composite image.

The graphics editor generally manipulates a number of images to create a composite image, as illustrated in FIG. 1. Typically, the graphics editor takes a foreground image 24 from a first image 20, and a background image 26 from a second image 28, and combines them using a matte image 32 to form a composite image 38. The matte image is a gray scale image used to generate the composite image 38. In particular, the light area of the matte image indicates that the area 24 of the first image 20 is to be used as the foreground image, and that the area 22 is to be ignored. Similarly, the dark area 36 of the matte image indicates that the area 26 of the second image 28 is to be the used as the background image.

Before generating the composite image 38, the graphics editor modifies the matte image so that the graphics workstation generates a feathering effect between the foreground and background images 24 and 26. In particular, the border area between the light and dark area of the matte image is filtered. If the matte image uses a gray scale that ranges between 0 and 255, the dark area for the background is 0, the light area for the foreground is 255, and the border area between the dark area and light area has values between 0 and 255 depending on the type of filtering applied to the matte image. The degree of realism in the composite image 38 often depends on the type of filtering. When filtering is poor, the viewer may identify a border 36 between the foreground image and the background image so that the effect of interaction between objects in the two images is diminished or lost.

Figure 2:
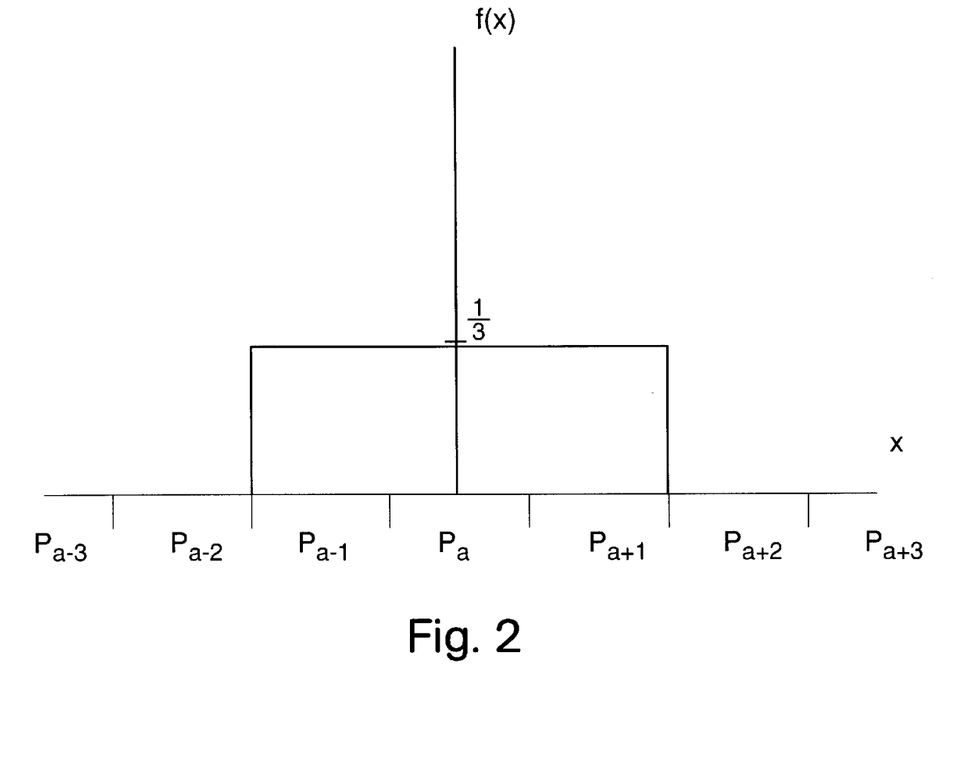
FIG. 2 is a graph of a 3×1 box filter function.

One conventional filter is a box filter which is commonly implemented as a finite impulse response filter (FIR). When a graphics editor filters a matte image through a box filter, the graphics editor identifies a border area in the matte image, and applies the box filter to each pixel of the border area. FIG. 2 illustrates a 3×1 box filter function. According to this box filtering function, a presently processed pixel value $P_a$ is set equal to an average of pixel values $P_{a-1}$, $P_a$ and $P_{a+1}$. Each pixel value is equally weighted as indicated by the fiat slope of the box filtering function.

Figure 3:
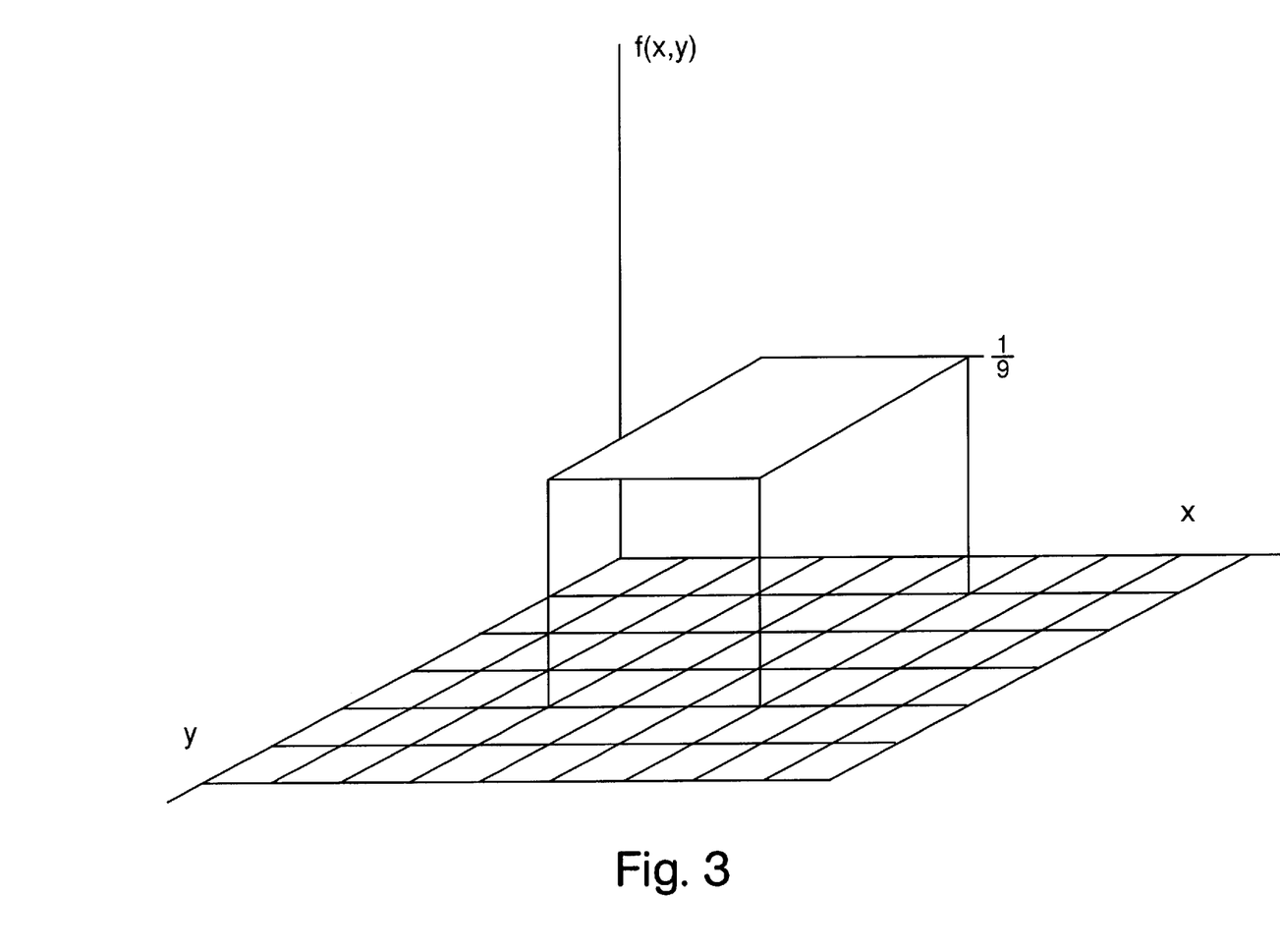
FIG. 3 is a graph of a 3×3 box filter function.

Filtering may be applied in two dimensions. FIG. 3 illustrates a 3×3 box filtering function. Here, the value of the center pixel is set to be the average of the values of the center pixel and the eight surrounding pixels, and the value of each pixel is equally weighted.

Figure 4:
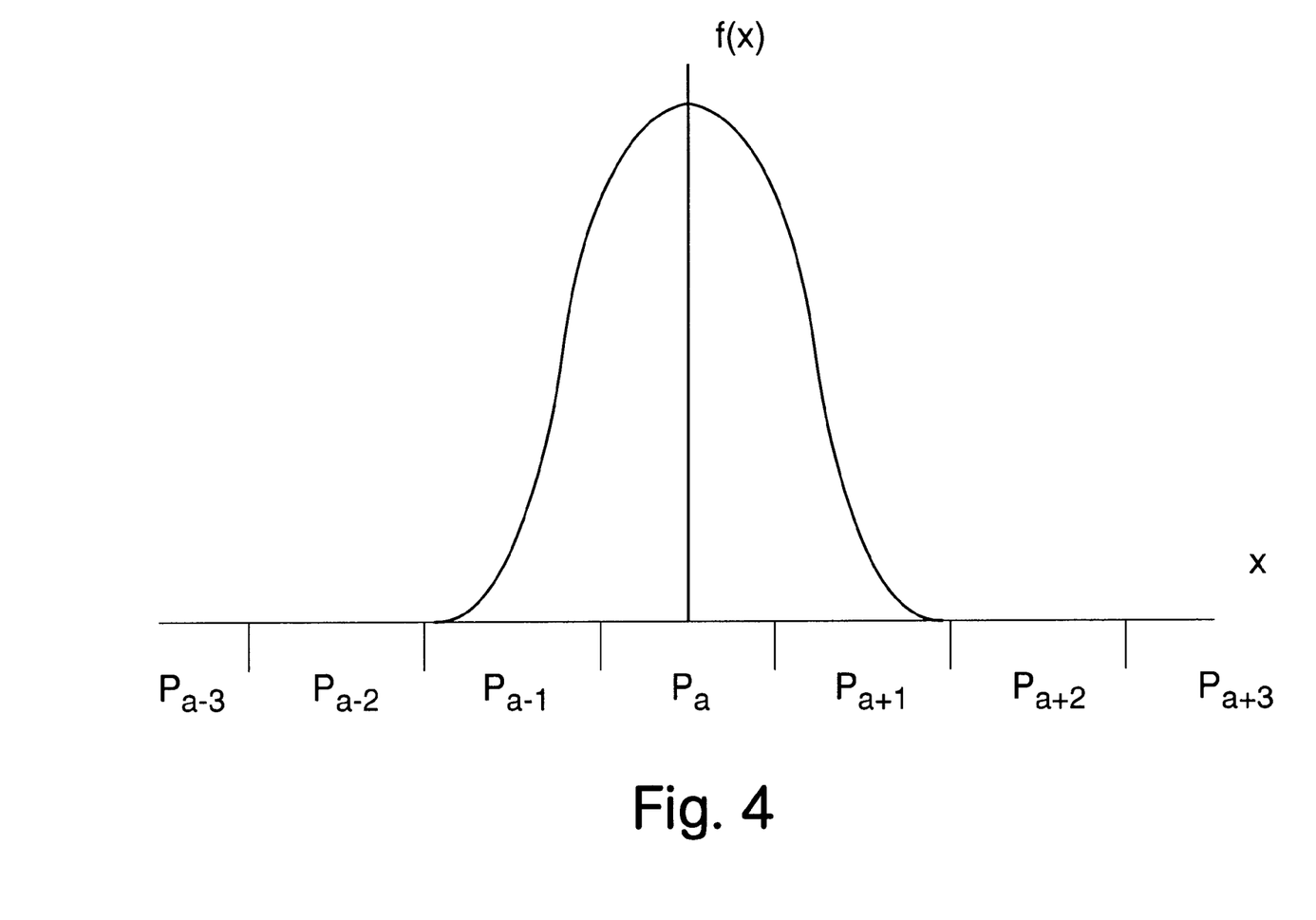
FIG. 4 is a graph of a 3×1 Gaussian filter function.

Another type of filter is a Gaussian filter which is also commonly implemented as an FIR filter. The Gaussian filter is defined by a Gaussian function, as illustrated in FIG. 4. The Gaussian filter weights each pixel according to its proximity to the pixel being processed, i.e., the center pixel. FIG. 4 shows a 3×1 Gaussian filter that weights the pixel $P_a$ by more than the adjacent pixels $P_{a-1}$ and $P_{a+1}$. A Gaussian filter may be implemented as a two-pass FIR filter: one pass for the horizontal direction, and one pass for the vertical direction.

Producing composite images using such filtering techniques has certain drawbacks. In particular, using a conventional box filtered matte image to create a feathered composite image typically provides unsatisfactory results, i.e., the composite image does not provide a realistic appearance of interaction between objects in the foreground and background images of the composite image. Also, box filtering provides biased results when the width of the filter is defined by an even number of pixels. For example, a typical 4×1 box filter processes the present pixel, one pixel to the left of the present pixel, and two pixels to the right of the present pixel. This unbalanced use of image data effectively shifts the results by half a pixel, and may be noticeable to the viewer. In particular, when playing a sequence of images, portions of the video image may appear to jitter due to box filtering using an even width box filter.

A composite image generated from a Gaussian filtered matte image generally provides suitable results. That is, the composite image provides a realistic appearance that objects in the foreground image are disposed within the background image. However, Gaussian filtering results in a substantial amount of processing time since each pixel value is multiplied by a weighted coefficient. For example, a 32×32 Gaussian filter operating on a 132 MHZ Power PC available from Apple Computer of Cupertino, California, requires approximately 1.5 minutes to filter completely a typical matte image having a dimension of 720×486 pixels. Accordingly, Gaussian filtering is impractical for feathering image sequences of 100 images or even 1000 images as often desired in the movie and television industries. Furthermore, as the width of the Gaussian filter increases, processing time increases. In particular, each pixel increase in the width of a Gaussian filter adds one multiply operation per pass and one add operation per pass for each pixel to be processed.

Using a matte image that has been filtered as described above also results in a composite image which has equal amounts of feathering into the foreground image and feathering out into the background image. However, in some cases, such a result creates artifacts in the image that are unacceptable. For example, if a picture of a yellow ball is being combined with an image of a grey sky background, feathering in of the grey sky into the yellow ball may produce undesirable results, such as a halo image around the ball (a halo effect is shown in image 38, FIG. 1).

One way to avoid such an undesirable result is by changing an outline which circumscribes a processing area of the image and reprocessing the image which results in numerous additional calculations. In addition, if the outline does not carefully circumscribe the processing area, the resulting image may not be accurate. For example, the resulting image may include overlapping portions or pinched corners.

SUMMARY OF THE INVENTION

The drawbacks of other filters may be overcome by box filtering a matte image horizontally with tail canceling, and vertically with tail canceling. A filtered image also may be adjusted to control the amount of feathering in or out of an image by applying an edge biasing function to the filtered image to create the matte image used to composite the image.

Accordingly, in one aspect a computer-implemented process for feathering a first image and a second image in a composite image uses an original matte image. The matte image may be defined in any manner but is typically defined according to a first and second image. A portion of the original matte image is box filtered horizontally and vertically to generate an intermediate matte image. At least a portion of the intermediate matte image is box filtered horizontally and vertically to generate a processed matte image. An edge biasing function is applied to the processed matte image. A composite image including the first image and the second image is then generated using the box-filtered processed matte image as modified by the edge biasing function.

In another aspect, an apparatus feathers a first image and a second image in a composite image using a matte image. The matte image may be defined according to either the first or second image or both, or according to some other image. At least a portion of the original matte image is box filtered horizontally and vertically to generate an intermediate matte image. At least a portion of the intermediate matte image is box-filtered horizontally and vertically to generate a processed matte image. An edge biasing function is applied to the processed matte image. A composite image including the first image and the second image is then generated based on the box-filtered processed matte image to which the edge biasing function has been applied.

In another aspect, the original matte image and the intermediate matte image are filtered using one dimensional (i.e., n×1 and 1×m) box filters.

In another aspect, a desired level of edge biasing is selected from a range of edge biasing values and the edge biasing function is generated according to the desired level of edge biasing.

In another aspect, defining a desired direction of edge biasing includes specifying a desired level of edge biasing representing proportionally more feathering in or feathering out or specifying equal feathering. In another aspect, values in an edge biasing table are scaling factors representing the desired level of edge biasing.

In another aspect, a composite image is produced by the process of selectively feathering a matte image. The matte image is produced by filtering a matte image to produce a feathered matte image. An edge biasing function is applied to the feathered matte image and the resulting selectively feathered matte image is used to produce the composite image.

In another aspect, a method includes generating a matte image for use in feathering a composite image. A filtered matte image is received and an edge biasing function is applied to the filtered matte image.

In another aspect, edge biasing involves adjusting contrast and brightness features of an edge of a matte image.

DETAILED DESCRIPTION

The present invention will be more completely understood through the following detailed description which should be read in conjunction with the attached drawing.

One embodiment is directed to a system for selectively feathering two images in a composite image and will be described in connection with FIG. 5. The operation of the modules of FIG. 5 will be described below in connection with FIG. 6. The system shown in FIG. 5 may be implemented as described below. One module of this system is a graphical user interface 52 which receives user input 50 and which outputs display data 54 to allow the user to input desired characteristics for the image composition. Through user input 50 to the graphical user interface module 52, a user may define feathering information 56. The feathering information 56 includes information to determine what size and type filter to apply to the matte image 64 and may be generated from a number of sources other than the graphical user interface, including a data file.

Another module is filter 58 which receives feathering information 56 and applies a corresponding filter to matte image 64 to output a feathered matte image 70. An edge biasing module 68 receives edge biasing data 66, which may be defined by user input 50 through the graphical user interface module 52. The edge biasing module 68 also receives the feathered matte image 70 which is output from the filter module 58. The edge biasing module 68 applies an edge biasing function according to the edge biasing data 66, to the feathered matte image 70 and outputs a selectively feathered matte image 72. Blender module 74 receives the selectively feathered matte image 72, along with image 60 and image 62 to produce a composite image 76.

Figure 5:
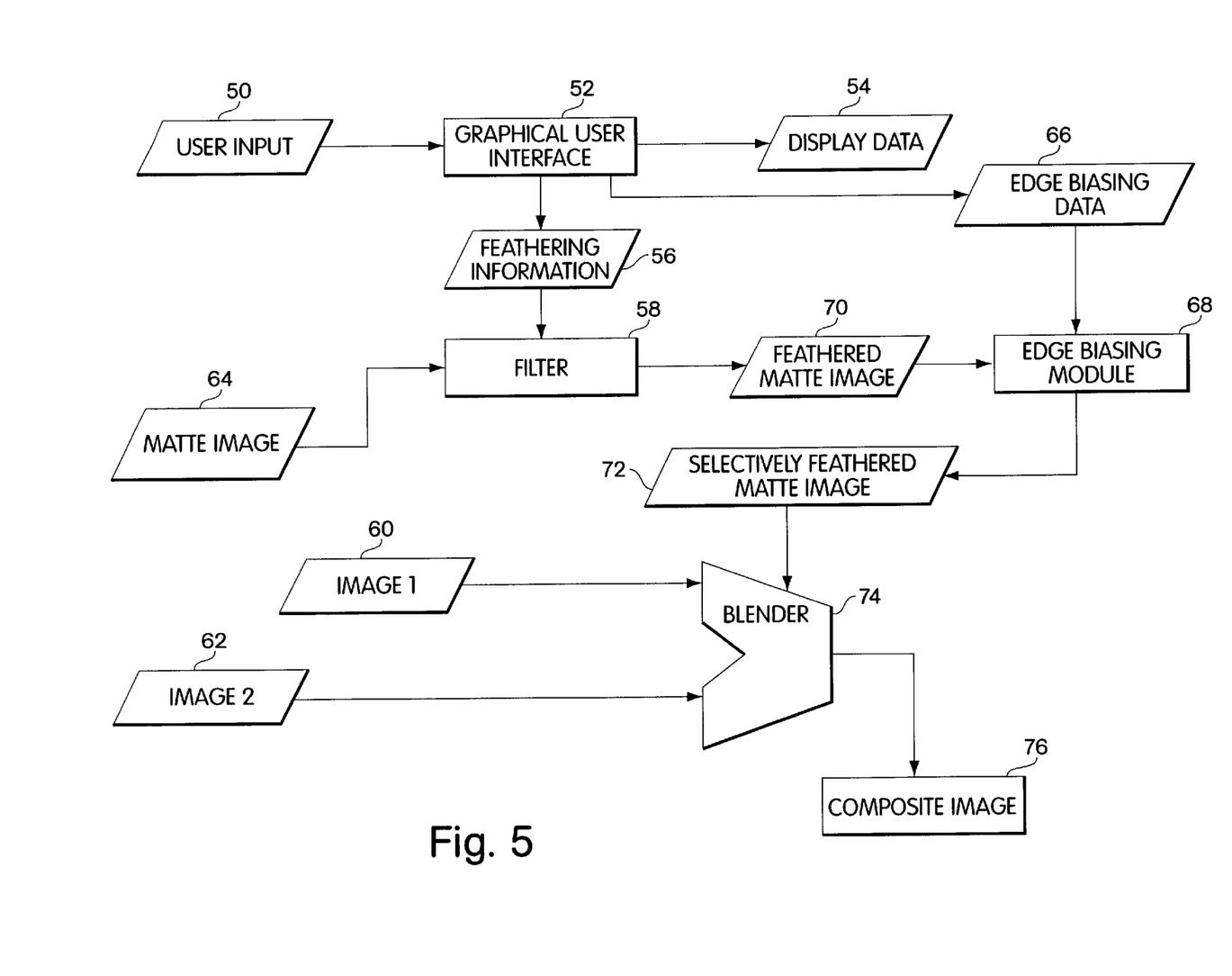
FIG. 5 is a block diagram of a compositing system for generating a composite image in one embodiment.

An example computer system to implement the system shown in FIG. 5 typically includes a main unit connected to both an output device which displays information to a user and an input device which receives input from a user. The main unit generally includes a processor connected to a memory system via an interconnection mechanism. The input device and output device also are connected to the processor and memory system via the interconnection mechanism.

It should be understood that one or more output devices may be connected to the computer system. Example output devices include a cathode ray tube (CRT) display, liquid crystal displays (LCD), printers, communication devices such as a modem, and audio output. It should also be understood that one or more input devices may be connected to the computer system. Example input devices include a keyboard, keypad, track ball, mouse, pen and tablet, communication device, and data input devices such as sensors. It should be understood the system of FIG. 5 is not limited to the particular input or output devices used in combination with the computer system or to those described herein.

The computer system may be a general purpose computer system which is programmable using a high level computer programming language, such as "C". The computer system may also be specially programmed, special purpose hardware for performing functions of one or more of the modules in FIG. 5. In a general purpose computer system, the processor is typically a commercially available processor, of which the series x86 processors, available from Intel, and similar devices from AMD and Cyrix, the 680X0 series microprocessors available from Motorola, the PowerPC microprocessor from IBM and the Alpha-series processors from Digital Equipment Corporation, are examples. Many other processors are available. Such a microprocessor executes a program called an operating system, of which WindowsNT, UNIX, DOS, VMS and OS8 are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the system of FIG. 5 is not limited to a particular memory system.

It should be understood the system of FIG. 5 is not limited to a particular computer platform, particular processor, or particular high-level programming language. Additionally, the computer system may be a multiprocessor computer system or may include multiple computers connected over a computer network.

The compositing of two streams of video data, may be performed by a computer program executed on general purpose circuits, or may be performed by special purpose hardware associated with the computer system, such as shown in U.S. Pat. 5,644,364 (Kurtze), which is incorporated by reference.

Figure 6:
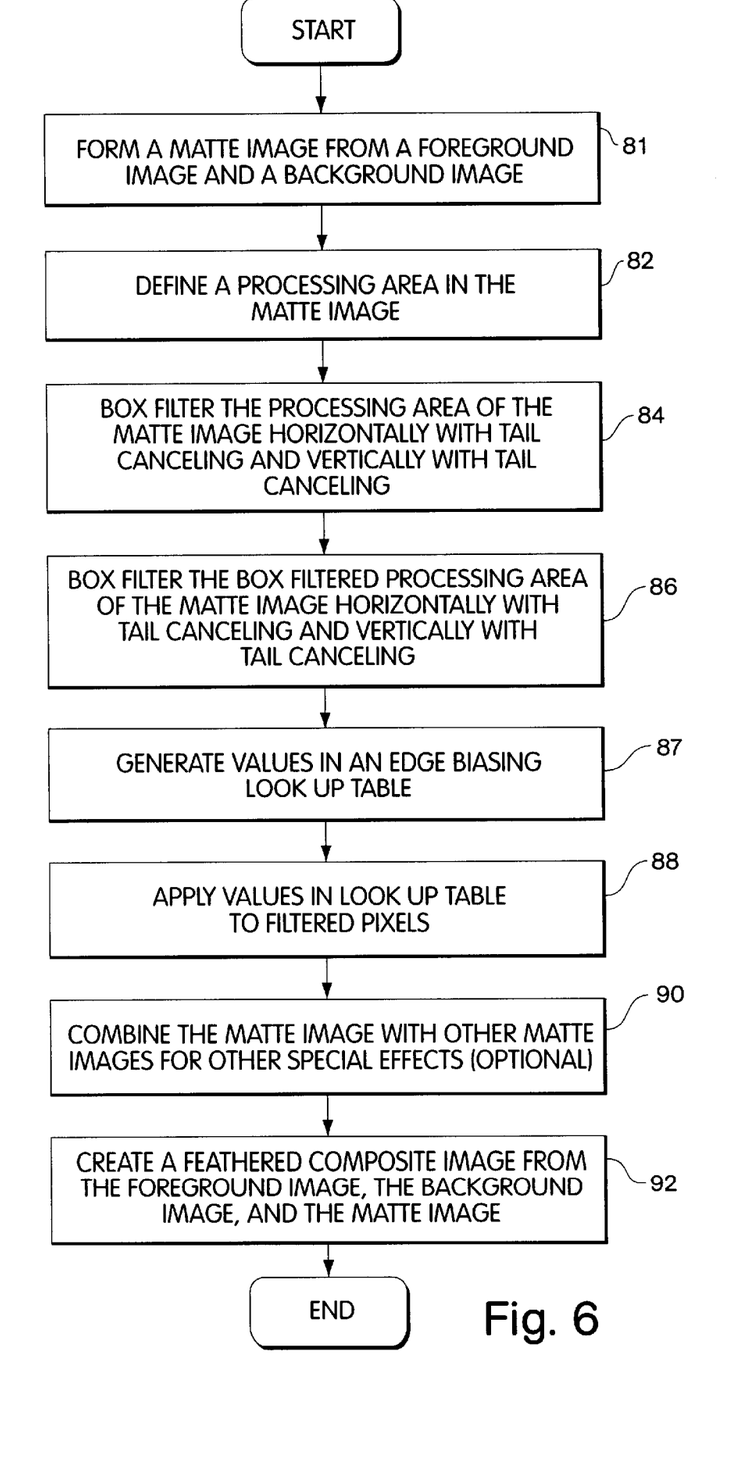
FIG. 6 is a flow diagram of a method according to one embodiment.

The process of selectively feathering an image is shown in FIG. 6. In step 81, a matte image having different gray scale values to indicate areas for a foreground image and a background image is formed, for example, by using a graphics editor or other editing tool. In general, each image is defined as a bit-mapped picture, in which each pixel has a value. The value of each pixel represents a value on a scale of zero (0) to one (1), with zero corresponding to a fully transparent color and one corresponding to a fully opaque color. In an 8-bit system the gray scale ranges from 0–255, and the matte image uses 0 to indicate the area of the background image (indicated by the dark region in the matte image 32), and 255 to indicate the area of the foreground image (indicated by the light region 30). In step 82, a processing area is defined by a bounding box and includes an area defined by the border between the foreground and background image which is between the light and dark area, i.e., where the gray scale values transition from 0 to 255. The rectangular bounding box around the border area is extended in each direction by n pixels to form the processing area.

In step 84, the processing area of the matte image is filtered. In one embodiment, the matte image is filtered first horizontally with tail canceling, defined below, and then vertically with tail canceling. Other kinds of filtering also may be used. In particular, each row of pixels in the processing area is filtered using an n×1 horizontal box filter with tail canceling. Value n is the size of the one dimensional box filter. After each row of pixels in the processing area has been filtered horizontally, each column of pixels in the processing area is filtered using a 1×m vertical box filter with tail canceling.

When filtering in the horizontal direction using an n×1 box filter, each row or horizontal line is processed one at a time. In particular, a first pixel $B_{a,b}$ in a horizontal line is calculated by computing an intermediate sum $R_{a,b}$ according to the following equation, wherein $A_{a,b}$ is an input pixel of a source image:

$$R_{a,b} = A_{a-(n-1)/2,b} + \ldots + A_{a-1,b} + A_{a,b} + A_{a+1,b} + \ldots + A_{a+(n-1)/2,b} \quad \text{(Eq. 1)}$$

For pixel locations beyond the matte image edge, the box filter uses the value of the edge pixel of the matte image. The intermediate sum $R_{a,b}$ may be stored in a memory or may be stored locally in a register of a processor. The value of the first output pixel $B_{a,b}$ which is the result of horizontal filtering is then set equal to the average pixel value using the following equation:

$$B_{a,b} = R_{a,b}/n \quad \text{(Eq. 2)}$$

Next, a value for a next pixel $B_{a+1,b}$ is determined. The n×1 box filter determines a new intermediate sum $R_{a+1,b}$. Rather than recalculating the intermediate sum $R_{a+1,b}$ using Eq. (1), the previously stored intermediate sum $R_{a,b}$ is used to determine the new intermediate sum $R_{a+1,b}$. In particular, the new intermediate sum $R_{a+1,b}$ is determined according to the following equation:

$$R_{a+1,b} = R_{a,b} - A_{a-(n-1)/2,b} + A_{a+((n-1)/2)+1,b} \quad \text{(Eq. 3)}$$

In Eq. (3), the value of the pixel that is no longer covered by the n×1 box filter is subtracted, and adds the value of the new pixel covered by the n×1 box filter. This kind of filtering is called "tail canceling" because the value of the pixel that is no longer covered by the box filter is dropped from the filter. This new intermediate sum $R_{a+1,b}$ is stored in memory and used to determine the value for pixel $B_{a+1,b}$ by dividing $B_{a+1,b}$ by n. The tail canceling process is repeated when determining a new intermediate value (e.g., $R_{a+2,b}$) and a new value for pixel (e.g., $B_{a+2,b}$) until the end of the horizontal line is reached. The process is then repeated for a next horizontal line beginning with a determination of an initial intermediate value $R_{a,b+1}$ using a calculation similar to that shown in Eq. (1). However, each subsequent determination of an intermediate value uses a calculation similar to that shown in Eq. (3). The horizontal filtering step is finished when each pixel in the processing area has been filtered.

Next, the processing area is vertically filtered with tail canceling using a 1×m vertical box filter in a manner similar to that described above for horizontal filtering. In particular, each column of the processing area is processed one at a time. The value of the first pixel $C_{a,b}$ is determined by generating an intermediate sum Sa,b according to the following equation:

$$S_{a,b}=B_{a,b-(n-1)/2,b}+ \ldots +B_{a,b-1}+B_{a,b}+B_{a,b+1}+ \ldots +B_{a,b+(n-1)/2} \quad \text{(Eq. 4)}$$

Then, the value of the pixel $C_{a,b}$ is determined using the following equation:

$$C_{a,b}=S_{a,b}/n \quad \text{(Eq. 5)}$$

After the value of the pixel $C_{a,b}$ has been determined, the vertical filter proceeds to process a new pixel $C_{a,b+1}$ in the vertical direction. In particular, a new intermediate sum $S_{a,b+1}$ is determined according to the following equation:

$$S_{a,b+1}=S_{a,b}-B_{a,b-(n-1)/2}+B_{a,b+((n-1)/2)+1} \quad \text{(Eq. 6)}$$

The subtracted pixel value corresponds to the pixel that is no longer covered by the vertical box filter after it is moved to process the next pixel $C_{a,b+1}$. Furthermore, the added pixel value corresponds to the pixel that is newly covered by the vertical box filter after it is moved to process the next pixel $C_{a,b+1}$. Then, the value of the pixel $C_{a,b+1}$ is determined using the following equation:

$$C_{a,b+1}=S_{a,b+1}/n \quad \text{(Eq. 7)}$$

The result obtained by box filtering the processing area through an n×1 horizontal box filter and a 1×m vertical box filter is mathematically equivalent to the result obtained by box filtering the processing area through an n×m box filter. The end result is a ramped effect along the border area between the light and dark area where the pixels along the border increase in value linearly.

In step 86, the processing area is box filtered again horizontally with tail canceling and vertically with tail canceling using the same n×1 and 1×m box filters, respectively to produce pixel values $P_{ab}$. The end result is that the pixels along the border area between the dark and light areas increase in value parabolically. The second pass through the filters allows for a more natural blending on the border between the dark and light areas. A similar mathematical effect would be achieved if the processing area were processed through a triangle filter with twice the width of the box filter. Such a triangular filter generally requires more processing time because it involves more weight coefficient calculations.

The result of the filtering steps described above is a filtered matte image which is used to create feathering of two images in a composite image. Feathering removes high frequencies in the matte image and smooths the image by blurring the edges. However, it may be desirable to selectively feather an image by specifying a direction of the feathering. The direction of feathering means the amount of feathering which is to occur inside or outside an object in an image. The amount may include the proportional amount of feathering into the object in the image as compared to feathering outside the object or the proportional amount of feathering on the border, also referred to as the edge, between the background and foreground images. Therefore, the process as described above in steps 81–86 may be expanded further to include edge biasing which includes a step of defining a direction of feathering. Edge biasing refers to further modifying pixel values on the edge after feathering or blurring of the edge, by changing the contrast and brightness of the matte image. The matte image is adjusted by changing values of the pixels in the matte image and will be described further below.

In step 87, this selectable feathering generally may be represented by a mathematical function. This function may be implemented in many ways, such as by direct calculation or by defining and using a look up table. This function may be generated based on user input as described below and may be used in a post-processing step which is performed on a feathered matte image after filtering of the matte image has been completed.

In one embodiment a look up table includes 256 scaling values based on a selected amount of edge biasing as applied to the edge biasing function. The number of values in the table is related to the dynamic range of the system used for generating the composite image. As stated above, an 8-bit system uses pixel values from 0–255, while a 10-bit system uses values from 0–1023. The edge biasing corresponds to a desired level of feathering in or feathering out, or to a ratio of the proportional amount of feathering in to feathering out along the edge of the foreground and background images.

In one embodiment a user may select an amount of edge biasing by moving a slider included in a graphical user interface. A selectable range of edge biasing may include, for example values from −100 to 100. As a user selects smaller values, such as values closer to the edge biasing value −100, the amount of feathering in increases, and therefore, a proportional amount of feathering out decreases. This results in less of the foreground image being seen in the resulting composite image as more of the background image is feathered into the foreground.

When a user selects larger edge biasing values, such as values closer to 100, the amount of feathering out increases, and therefore, a proportional amount of feathering in decreases. This results in less of the background image being seen in the resulting image as more of the foreground image is feathered out to the background. An edge biasing value chosen in the center of the range of selectable values, such as 0 in this example, results in equal amounts of feathering in and out. The range of the selectable edge biasing values may be defined with any numbering scheme which allows a user to identify one end of the range as resulting in more feathering out and one end of the range resulting in more feathering in as applied to the composite image.

In one embodiment, there is a linear relationship between the user selected edge biasing values and the scaling values to be applied to the pixel values. The relationship may be defined as follows:

$$P'_{ab}=\text{bias}(P_{ab}, E) \quad \text{(Eq. 8)}$$

The value E is the amount of edge biasing selected by a user. Edge biasing is applied to pixel $P_{ab}$, which is determined through the above filtering steps, based on the user input value E. $P'_{ab}$ is the value of a pixel in a resulting composite image which has been scaled according to the selected edge biasing. In one embodiment, this relationship may be expressed as follows:

If edge biasing value E=0, then:

$$P'_{ab}=P_{ab} \quad\quad\quad (Eq. 9)$$

If edge biasing value E<0, then:

$$P'_{ab}=(1.0+E/-100)*P_{ab}+2.55*E \quad\quad\quad (Eq. 10)$$

If edge biasing value E>0, then:

$$P'_{ab}=(1.0+E/100)*P_{ab} \quad\quad\quad (Eq. 11)$$

with limits such that if $P'_{ab}$>255, then $P'_{ab}$=255 and if $P'_{ab}$<0, then $P'_{a,b}$=0.

After the filtered values of the pixels in the matte image have been determined, as discussed above in steps 81–86, then the selected edge biasing is applied to the filtered pixel values ($P_{ab}$) in step 88, using the corresponding edge biasing function.

In one embodiment using a look up table, the value for each pixel in the processing area of the matte image is applied to the look up table in step 88 according to the following equation:

$$P'_{a,b}=LUT[P_{ab}] \quad\quad\quad (Eq. 12)$$

Thus, a pixel $P'_{a,b}$ is the value of a pixel in the resulting composite image which has been scaled according to the selected desired edge biasing after the filtering process. Pixel $P'_{a,b}$ is determined through the above filtering steps and is applied to the look up table to generate the value $P'_{a,b}$ representing the effect of the specified edge biasing. In this embodiment there is a linear relationship between the user selected edge biasing values and the scaling values for the look up table. Other linear and nonlinear relationships also may be defined.

Figure 8A:
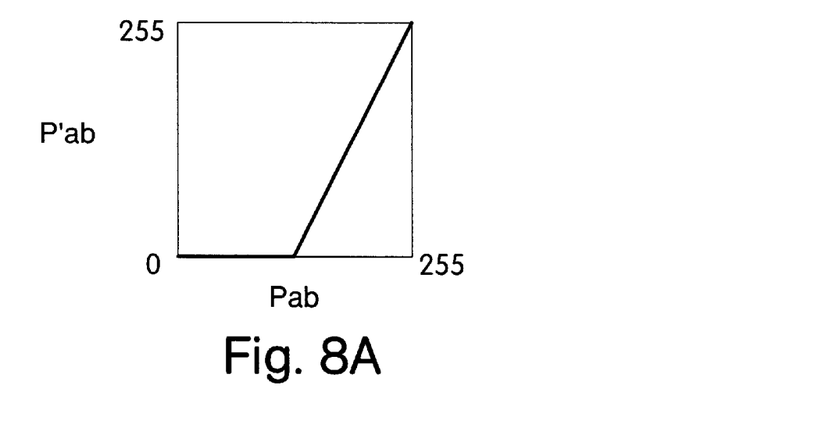
FIG. 8a is a graph of the result of feathering in edge biasing.

For example, as shown in FIG. 8a, the resulting values of $P'_{a,b}$ are shown after taking into account filtered pixel value $P_{a,b}$ and a look up table with 256 values representing a user selected edge biasing value of −100. As discussed above, this results in an image with a greater amount of feathering in characteristics as compared to feathering out. As shown in FIG. 8a, when an input to the look up table is a value of 0 for $P_{a,b}$ which is edge biased for feathering in, the result is an output value of $P'_{a,b}$ of 0. When the value Of $P_{a,b}$=128, then the output value $P'_{a,b}$=0 and when $P_{a,b}$=255, then $P'_{a,b}$=255.

Figure 8B:
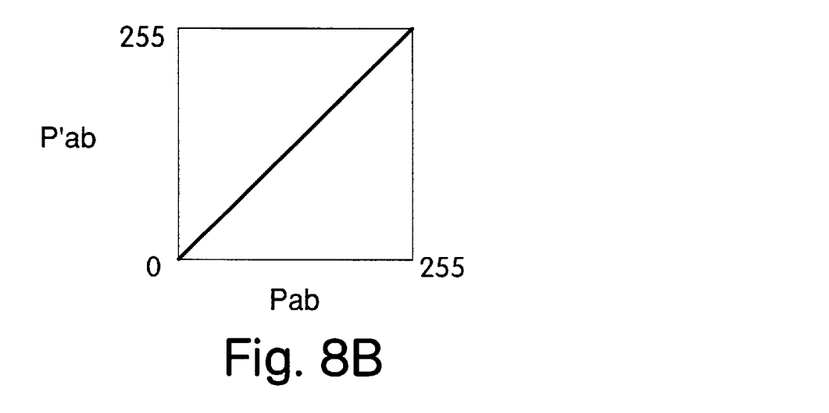
FIG. 8b is a graph of the result of equal edge biasing.

FIG. 8b shows an example result of a user selecting an edge biasing value of 0, which in this example indicates the user desires equal amounts of feathering in and out. As shown in FIG. 8b, when an input to the look up table is a value of 0 for $P_{a,b}$, with an edge biasing value of 0, the result is an output value of $P'_{a,b}$ of 0. When the input value of $P_{ab}$=128, then the value of $P'_{a,b}$=128 and when the input value of $P_{a,b}$=255 the resulting output value of $P'_{a,b}$=255.

Figure 8C:
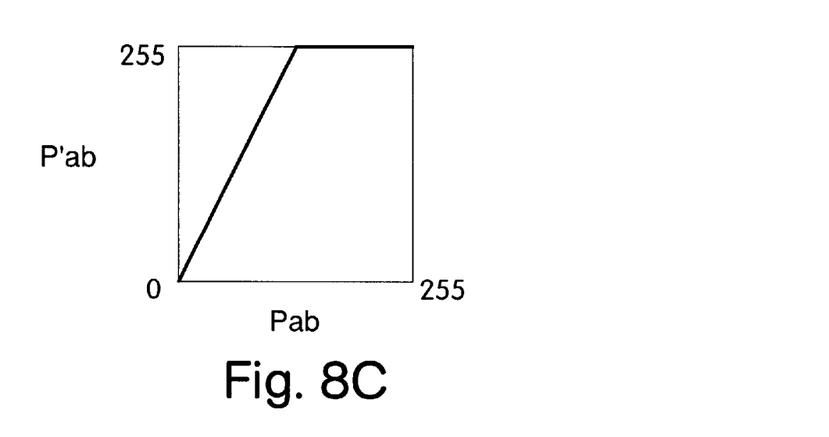
FIG. 8c is a graph of the result of feathering out edge biasing.

FIG. 8c shows an example result of a user selecting an edge biasing value of 100, which in this example indicates the user desires an image with greater feathering out characteristics as compared to feathering in. According to this selection, when the input to the look up table is a value of 0 for $P_{a,b}$, the output value of $P'_{a,b}$=0. When the input value of $P_{a,b}$=128, then the value of $P'_{a,b}$=255 and when the input value of $P_{a,b}$=255, the resulting output value of $P'_{a,b}$=255.

Referring again to FIG. 6, in step 90, the graphics editor may wish to incorporate additional special effects such as color change effects or opacity effects. The graphics editor may incorporate such effects by combining the box filtered matte image area with other matte images using multiplication or minimization operations. In step 92, a feathered composite image is generated using the selectively feathered matte image according to conventional methods.

Figure 7A:
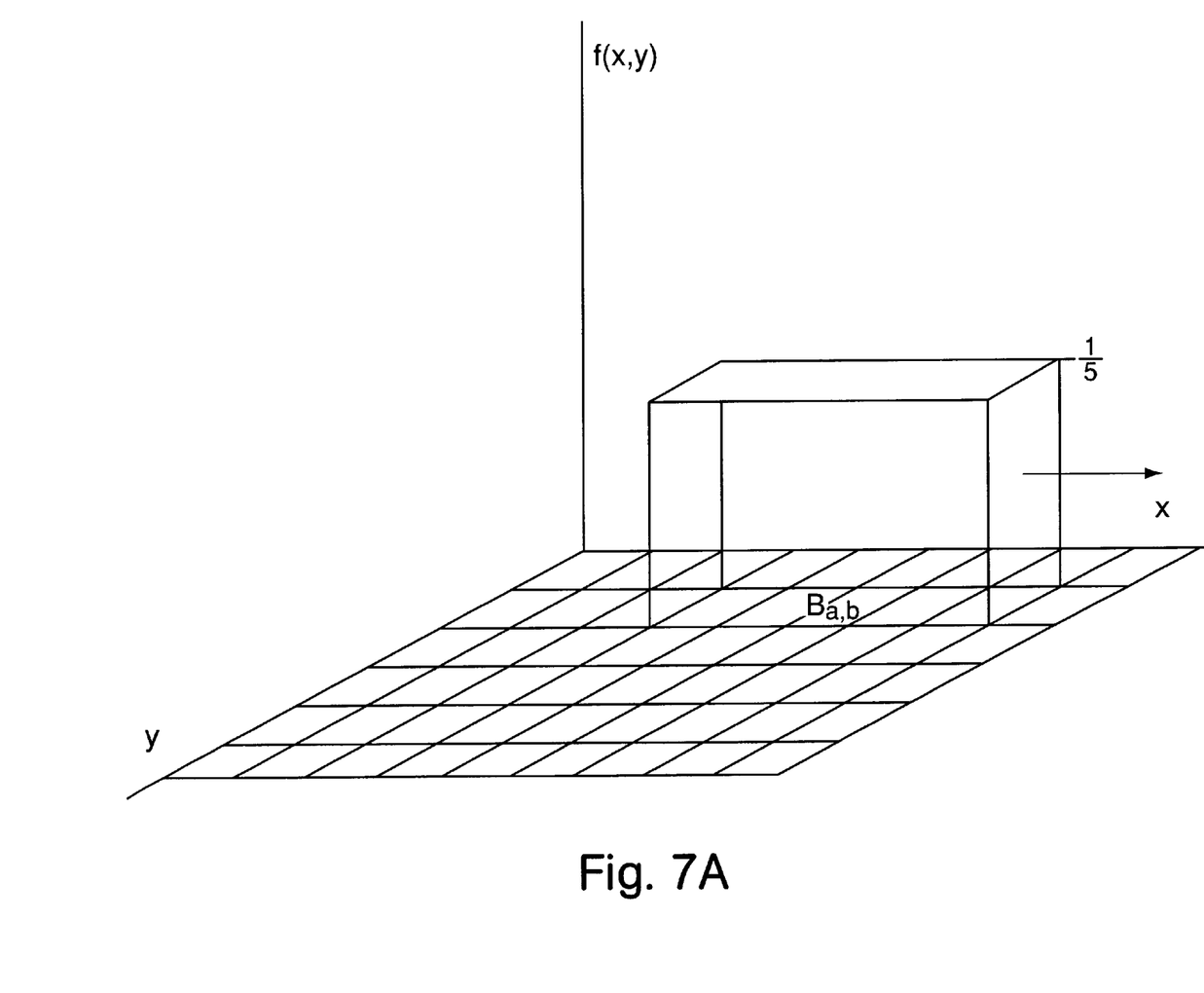
FIG. 7a is a graph of a horizontal filtering function according to one embodiment.
Figure 7B:
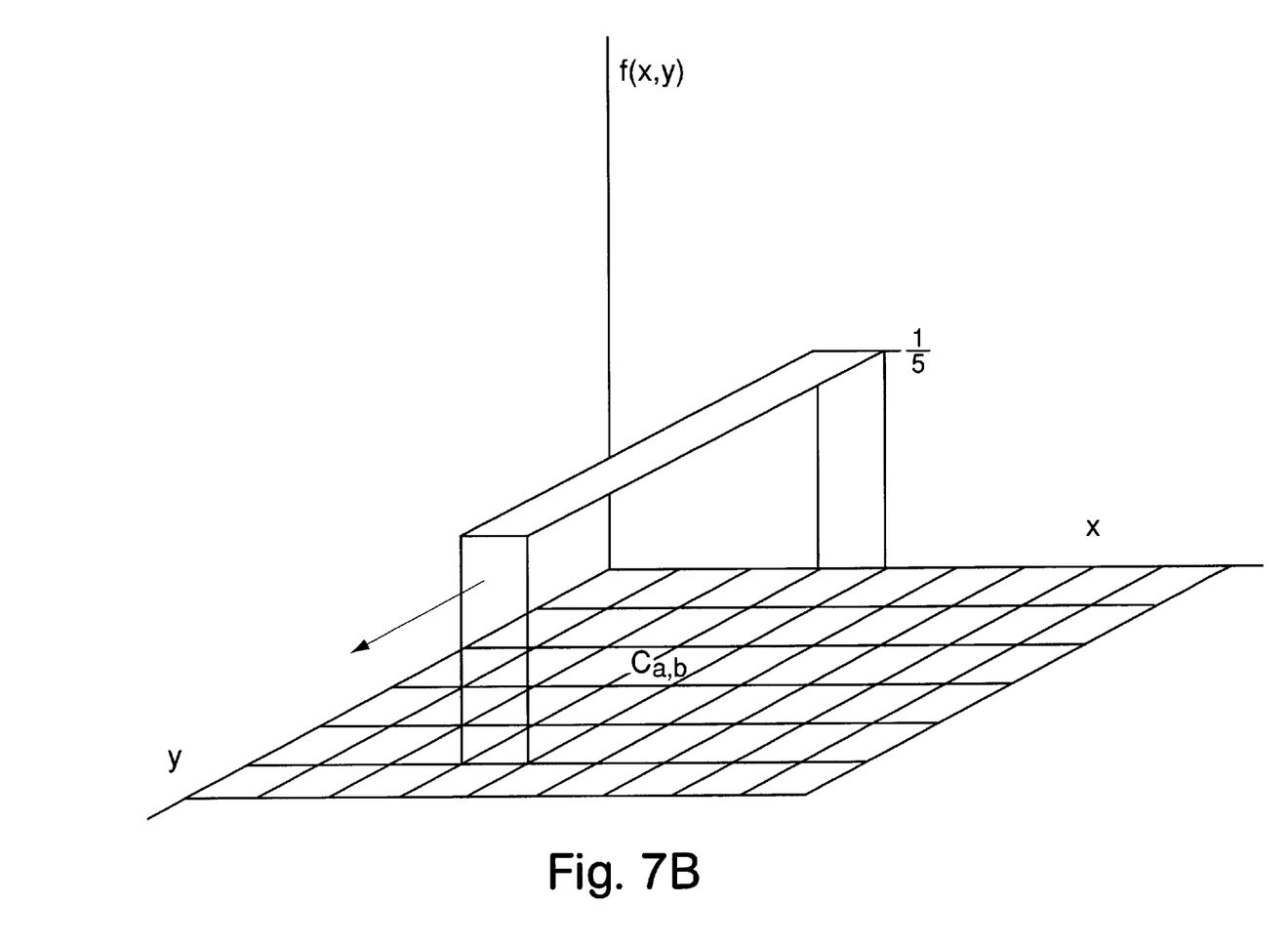
FIG. 7b is a graph of a vertical filtering function according to one embodiment.

An example will now be explained with reference to FIGS. 7a and 7b. FIG. 7a illustrates how a 5×1 horizontal box filter calculates a pixel $B_{a,b}$. The 5×1 horizontal box filter sets the value of the pixel $B_{a,b}$ to be the average of $A_{a,b}$, its two neighbors to the left $A_{a-2,b}$ and $A_{a-1,b}$ and its two neighbors to the right $A_{a+1,b}$ and $A_{a+2,b}$. Each pixel value is equally weighted. Then, the 5×1 box filter proceeds horizontally to process an adjacent pixel. When processing the adjacent pixel, the value is determined using an intermediate value calculated using a tail canceling operation. In particular, as described above, the pixel value of the pixel that is no longer covered by the box filter is subtracted from the intermediate value, and adds the value of the newly covered pixel to the intermediate value. FIG. 7b illustrates a 1×5 vertical box filter for calculating a pixel $C_{a,b}$. in a similar manner.

Filtering the processing area through a 5×1 horizontal box filter with tail canceling and a 1×5 vertical box filter with tail canceling is equivalent to filtering the processing area through a 5×5 box filter. However, processing time is reduced by the tail canceling process so that the majority of pixel value determinations only include one subtract operation, one add operation, and one divide operation for each pass.

Composite images generated using the process shown in FIG. 6 are generally of substantially higher quality than those that are processed only once by a box filter. In particular, results of the process of FIG. 6 are difficult to distinguish from composite images generated using a Gaussian filter. Furthermore, the time to box filter the processing area using the process shown in FIG. 6 is substantially less than that by either a conventional box filter or a Gaussian filter.

Modifications and enhancements may be made to the above-described embodiments, and are intended to be included within the scope of the invention. For example, the order of horizontally filtering and vertically filtering may be reversed. According to an embodiment, processing area is vertically filtered with tail canceling before being horizontally filtered with tail canceling. The end result after box filtering the processing area first vertically, then horizontally, is equivalent to filtering the processing area first horizontally, then vertically.

Additionally, the box filter may have an even filter width without biasing the image in a particular direction. In particular, when filtering the processing area, the first pass through the box filter should bias each pixel in one direction, e.g., to the left. The second pass through the box filter should bias each pixel in the opposite direction, e.g., to the right. The end result is that there is no overall biasing.

Also, it should be understood that the filter widths of the horizontal box filter and the vertical box filter may be extended without significantly decreasing performance. In particular, only the initial pixel value calculation is affected, i.e., the calculation includes one additional add operation. Other additional operations are not required to extend filter width per pass.

Additionally, it should be understood that the filter width of the one dimensional horizontal box filter and the filter width of the one dimensional vertical box filter do not need to be the same. Different feathering effects are possible by using different filter widths for the horizontal and vertical box filters, and by using different filter widths for the box filters when processing the matte image for the first time, and subsequently processing the matte image for the second time.

Furthermore, the embodiments are suitable for real time applications since processing time is substantially reduced. Accordingly, foreground and background images may be blended in real time.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A method for feathering a first image and a second image in a composite image using an original matte image, comprising the steps of:
   a first box filtering step including box filtering at least a portion of the original matte image horizontally with a one-dimensional horizontal box filter and vertically with a one-dimensional vertical box filter to generate an intermediate matte image;
   a second box filtering step including box filtering at least a portion of the intermediate matte image horizontally and vertically to generate a processed matte image;
   applying an edge biasing function to the processed matte image; and
   generating the composite image including the first image and the second image according to the box-filtered matte image as modified by the edge biasing function.

2. The method of claim 1, wherein the step of applying an edge biasing function includes:
   selecting a desired direction of edge biasing; and
   generating edge biasing values according to the selected desired direction.

3. The method of claim 2, wherein the desired direction includes at least one of feathering in, feathering out or equal feathering.

4. The method of claim 2, wherein the edge biasing function changes contrast and brightness in the feathered matte image.

5. The method of claim 1, wherein each matte image includes a plurality of pixels, and wherein at least one of the steps of box filtering includes a step of tail canceling so that a value of a pixel of the tail canceled matte image is a result of a subtract operation.

6. The method of claim 1, wherein the step of box filtering the original matte image includes a step of processing the original matte image through a first box filter having an even filter width that is biased in a first direction; and wherein the step of box filtering the intermediate matte image includes a step of processing the intermediate matte image through a second box filter having an even filter width that is biased in a second direction that is opposite the first direction.

7. The method of claim 1, wherein at least one of the steps of box filtering includes a step of processing a matte image through a one dimensional box filter.

8. The method of claim 1, wherein each matte image includes a plurality of rows of pixels, and wherein the method further comprises a step of:
   increasing a filter width of a box filter so that the box filter performs an extra add operation when calculating a value of an initial pixel of a row of pixels of a matte image, while maintaining the number of add operations when calculating values of other pixels in the row of pixels of the matte image.

9. The method of claim 1, wherein at least one of the steps of box filtering includes steps of:
   processing a matte image through a one dimensional vertical box filter having a first width; and
   processing the matte image through a one dimensional horizontal box filter having a second width that is different than the first width.

10. The method of claim 1, wherein each step of box filtering and the step of generating is performed in real time, and wherein the method further includes a step of:
    displaying the composite image on a display device in real time.

11. An apparatus for feathering a first image and a second image in a composite image, comprising:
    a general purpose computer including:
    a memory that stores a program; and
    a processor that, when executing the program, receives an original matte image, box filters, in a first box filtering step at least a portion of the original matte image horizontally and vertically to generate an intermediate matte image, box filters, in a second box filtering step, at least a portion of the intermediate matte image horizontally with a one-dimensional horizontal box filter and vertically with a one-dimensional vertical box filter to generate a processed matte image, receives an edge biasing function, applies the edge biasing function to the processed matte image, and generates a composite image including the first image and the second image based on the box-filtered processed matte image as modified by the edge biasing function.

12. The apparatus of claim 11, wherein each matte image includes a plurality of pixels, and wherein the processor, when box filtering a matte image, tail cancels the matte image so that a value of a pixel of the tail canceled matte image is a result of a subtract operation.

13. The apparatus of claim 11, wherein the processor, when box filtering the original matte image, processes the original matte image through a first box filter having an even filter width that is biased in a first direction; and wherein the processor, when box filtering the intermediate matte image, processes the intermediate matte image through a second box filter having an even filter width that is biased in a second direction that is opposite the first direction.

14. The apparatus of claim 11, wherein the processor box filters at least one of the matte images using a one dimensional box filter.

15. The apparatus of claim 11, wherein each matte image includes a plurality of rows of pixels, and wherein the processor, when executing the program, increases a filter width of a box filter by performing an extra add operation when calculating a value of an initial pixel of a row of pixels of a matte image, while maintaining the number of add operations when calculating values of other pixels in the row of pixels of the matte image.

16. The apparatus of claim 11, wherein the processor, when box filtering a matte image, processes the matte image through a one dimensional vertical box filter having a first width, and processes the matte image through a one dimensional horizontal box filter having a second width that is different than the first width.

17. The apparatus of claim 11, wherein the processor executes the program in real time, and wherein the general purpose computer further includes a display device that displays the composite image in real time.

18. An apparatus for feathering a first image and a second image in a composite frame, comprising:
a general purpose computer including:
a memory that stores a program; and
a processor that, when executing the program, receives an original matte image, box filters, in a first box filtering step, at least a portion of the original matte image horizontally and vertically to generate an intermediate matte image, box filters, in a second box filtering step, at least a portion of the intermediate matte image horizontally with a one-dimensional horizontal box filter and vertically with a one-dimensional vertical box filter to generate a processed matte image, and generates a composite image by blending the first image and the second image together according to the box-filtered processed matte image.

19. The apparatus of claim 18, wherein each matte image includes a plurality of pixels, and wherein the processor, when box filtering a matte image, tail cancels the matte image so that a value of a pixel of the tail canceled matte image is a result of a subtract operation.

20. The apparatus of claim 18, wherein the processor, when box filtering the original matte image, processes the original matte image through a first box filter having an even filter width that is biased in a first direction; and wherein the processor, when box filtering the intermediate matte image, processes the intermediate matte image through a second box filter having an even filter width that is biased in a second direction that is opposite the first direction.

21. The apparatus of claim 18, wherein each matte image includes a plurality of rows of pixels, and wherein the processor, when executing the program, increases a filter width of a box filter by performing an extra add operation when calculating a value of an initial pixel in a row of pixels of a matte image, while maintaining the number of add operations when calculating values of other pixels in the row of pixels of the matte image.

22. The apparatus of claim 18, wherein the processor, when box filtering a matte image, processes the matte image through a one dimensional vertical box filter having a first width, and processes the matte image through a one dimensional horizontal box filter having a second width that is different than the first width.

23. The apparatus of claim 18, wherein the processor executes the program in real time, and wherein the general purpose computer further includes a display device that displays the composite image in real time.

24. A method for feathering a first image and a second image in a composite frame, comprising the steps of:
receiving an original matte image;
a first box filtering step including box filtering at least a portion of the original matte image horizontally with a one-dimensional horizontal box filter and vertically with a one dimensional vertical box filter to generate an intermediate matte image;
a second box filtering step including box filtering at least a portion of the intermediate matte image horizontally and vertically to generate a processed matte image; and
generating a composite image by blending the first image and the second image together according to the processed matte image.

25. The method of claim 24, wherein each matte image includes a plurality of pixels, and wherein at least one of the steps of box filtering includes applying a box filter sequentially to pixels in an image and includes a step of tail canceling to compute a result of box filtering.

26. The method of claim 24, wherein the step of box filtering the original matte image includes a step of processing the original matte image through a first box filter having an even filter width that is biased in a first direction; and wherein the step of box filtering the intermediate matte image includes a step of processing the intermediate matte image through a second box filter having an even filter width that is biased in a second direction that is opposite the first direction.

27. The method of claim 24, wherein each matte image includes a plurality of rows of pixels, and wherein the method further comprises a step of:
increasing a filter width of a box filter so that the box filter performs an extra add operation when calculating a value of an initial pixel in a row of pixels of a matte image, while maintaining the number of add operations when calculating values of other pixels in the row of pixels of the matte image.

28. The method of claim 24, wherein at least one of the steps of box filtering includes steps of:
processing a matte image through a one dimensional vertical box filter having a first width; and
processing the matte image through a one dimensional horizontal box filter having a second width that is different than the first width.

29. The method of claim 24, wherein each step of box filtering and the step of generating is performed in real time, and wherein the method further includes a step of:
displaying the composite image on a display device in real time.

* * * * *